United States Patent [19]

Ozeki et al.

[11] Patent Number: 5,086,957
[45] Date of Patent: Feb. 11, 1992

[54] MOLTEN STEEL POURING NOZZLE

[75] Inventors: Hidekichi Ozeki; Takafumi Aoki, both of Gifu, Japan

[73] Assignee: Akechi Ceramics Co., Ltd., Gifu, Japan

[21] Appl. No.: 619,292

[22] Filed: Nov. 28, 1990

[30] Foreign Application Priority Data

Jan. 23, 1990 [JP] Japan .................................. 2-14218

[51] Int. Cl.$^5$ .............................................. B22D 41/08
[52] U.S. Cl. .................... 222/607; 222/606; 501/104
[58] Field of Search ................ 222/607, 606, 591; 501/104, 106

[56] References Cited

U.S. PATENT DOCUMENTS

| 3,722,821 | 3/1973 | Jaeger et al. | 501/104 |
| 4,780,434 | 10/1988 | Wanatabe et al. | 501/104 |
| 4,989,762 | 2/1991 | Ando et al. | 501/104 |

FOREIGN PATENT DOCUMENTS

| 57-71860 | 5/1982 | Japan . |
| 62-148076 | 7/1987 | Japan . |
| 64-40154 | 2/1989 | Japan . |

Primary Examiner—S. Kastler, III
Attorney, Agent, or Firm—Frishauf, Holtz, Goodman & Woodward

[57] ABSTRACT

A molten steel pouring nozzle having, along the axis thereof, a bore through which molten steel flows. At least part of an inner portion of the molten steel pouring nozzle, which inner portion forms the bore, is formed of a refractory consisting essentially of:

zirconia clinker comprising calcium zirconate: from 40 to 89 wt. %, where, a content of calcium oxide in the zirconia clinker being within a range of from 8 to 35 weight parts relative to 100 weight parts of the zirconia clinker;

graphite: from 10 to 35 wt. %; and calcium silicate: from 1 to 25 wt. %, where, a content of calcium oxide in the calcium silicate being within a range of from 40 to 54 weight parts relative to 100 weight parts of the calcium silicate.

14 Claims, 1 Drawing Sheet

F I G. 1
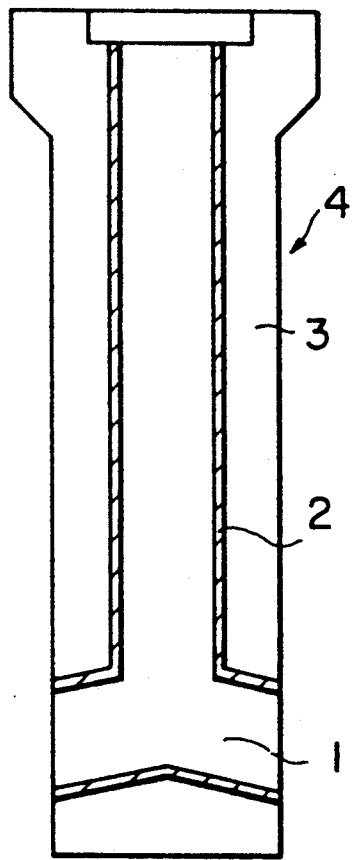
F I G. 2
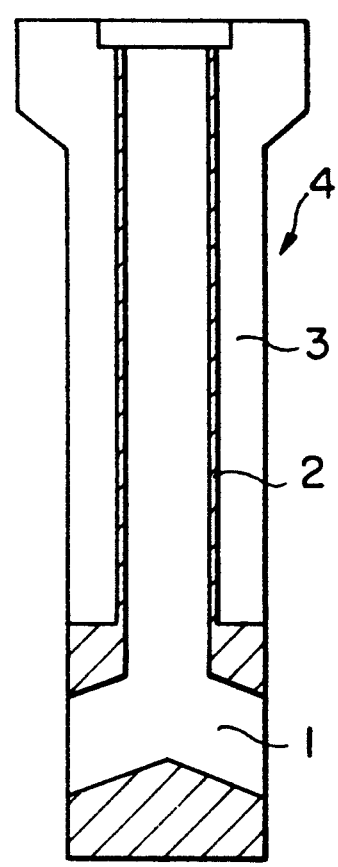

MOLTEN STEEL POURING NOZZLE

REFERENCE TO PATENTS, APPLICATIONS AND PUBLICATIONS PERTINENT TO THE INVENTION

As far as we know, there are available the following prior art documents pertinent to the present invention:
(1) Japanese Patent Provisional Publication No. 62-148,076;
(2) Japanese Patent Provisional Publication No. 57-71,860; and
(3) Japanese Patent Provisional Publication No. 64-40,154.

The contents of the prior arts disclosed in the above-mentioned prior art documents will be discussed hereafter under the heading of the "BACKGROUND OF THE INVENTION".

FIELD OF THE INVENTION

The present invention relates to a molten steel pouring nozzle which permits effective prevention of reduction or clogging of the bore of the nozzle, through which molten steel flows, when continuously casting an aluminum-killed molten steel containing aluminum.

BACKGROUND OF THE INVENTION

Continuous casting of molten steel is carried out, for example, by pouring molten steel received from a ladle into a tundish, through a molten steel pouring nozzle secured to the bottom wall of the tundish, into a vertical mold arranged below the molten steel pouring nozzle, to form a cast steel strand, and continuously withdrawing the thus formed cast steel strand into a long strand.

As the above-mentioned molten steel pouring nozzle, a nozzle comprising an alumina-graphite refractory is widely used in general.

However, the molten steel pouring nozzle comprising an alumina-graphite refractory has the following problems:

When casting an aluminum-killed molten steel, aluminum added as a deoxidizer reacts with oxygen present in molten steel to produce non-metallic inclusions such as α-alumina. The thus produced non-metallic inclusions such as α-alumina adhere and accumulate onto the surface of the bore of the molten steel pouring nozzle, through which molten steel flows, to clog up the bore, thus making it difficult to achieve stable casting. Furthermore, the non-metallic inclusions such as α-alumina, thus accumulated onto the surface of the bore peel off or fall down, and are entangled into the cast steel strand, thus degrading the quality of the cast steel strand.

For the purpose of preventing the above-mentioned reduction or clogging of the bore of the molten steel pouring nozzle caused by the non-metallic inclusions such as α-alumina present in molten steel, there is a popularly used method which comprises ejecting an inert gas from the surface of the bore of the molten steel pouring nozzle toward molten steel flowing through the bore, to prevent the non-metallic inclusions such as α-alumina present in molten steel from adhering and accumulating onto the surface of the bore.

However, the above-mentioned method comprising ejecting an inert gas from the surface of the bore of the molten steel pouring nozzle toward molten steel flowing through the bore, has the following problems:

A larger amount of the ejected inert gas causes entanglement of bubbles produced by the inert gas into the cast steel strand, resulting in the production of defects such as pinholes in a steel product after the completion of rolling. This problem is particularly serious in the casting of molten steel for a high-quality thin steel sheet. A smaller amount of the ejected inert gas causes, on the other hand, adhesion and accumulation of the non-metallic inclusions such as α-alumina onto the surface of the bore of the molten steel pouring nozzle, thus causing reduction or clogging of the bore. In the casting of molten steel for a long period of time, a stable control of the amount of ejected inert gas from the surface of the bore of the molten steel pouring nozzle becomes gradually more difficult, according as a structure of the refractory forming the molten steel pouring nozzle degrades. As a result, the non-metallic inclusions such as α-alumina adhere and accumulate onto the surface of the bore of the molten steel pouring nozzle, thus causing reduction or clogging of the bore. Furthermore, in the casting of molten steel for a long period of time, a local erosion of the surface of the bore of the molten steel pouring nozzle is considerably accelerated by the ejected inert gas. This makes it impossible to continue the ejection of the inert gas and may cause rapid clogging of the bore.

With a view to preventing reduction or clogging of the bore of the molten steel pouring nozzle without the use of a mechanical means such as the ejection of an inert gas, there is disclosed in Japanese Patent Provisional Publication No. 62-148,076 dated July 2, 1987, a molten steel pouring nozzle formed of a refractory consisting essentially of:
unstabilized zirconia : from 35 to 75 wt.%,
graphite : from 5 to 15 wt.%, and
the balance being stabilized zirconia.
(hereinafter referred to as the "prior art 1").

However, the above-mentioned molten steel pouring nozzle of the prior art 1 has the following problems:

Since the above-mentioned unstabilized zirconia and stabilized zirconia hardly react with non-metallic inclusions such as α-alumina, recesses are never formed on the surface of the bore of the molten steel pouring nozzle, through the reaction of the refractory forming the nozzle with the non-metallic inclusions such as α-alumina, and as a result, the non-metallic inclusions such as α-alumina never adhere onto the surface of the bore. However, when used for a long period of time at a high temperature within a range of from 900° to 1,100° C., unstabilized zirconia, which is a main constituent of the refractory forming the molten steel pouring nozzle, suffers from a transformation in the crystal structure thereof with an increased thermal expansion coefficient, resulting in the disintegration of crystal grains of unstabilized zirconia. In addition, a reduction reaction takes place between unstabilized zirconia having the disintegrated crystal grains and graphite, thus degrading the structure of the refractory.

Furthermore, when stabilized zirconia is used for a long period of time at a high temperature as described above, destabilization thereof is accelerated and transforms into unstabilized zirconia. This results in a phenomenon similar to that described above and the structure of the refractory is degraded.

As a result, recesses are formed on the surface of the bore of the molten steel pouring nozzle. Non-metallic inclusions such as α-alumina adhere and accumulate in these recesses, causing reduction or clogging of the bore of the molten steel pouring nozzle. It is thus difficult to use this molten steel pouring nozzle for a long period of time for continuously casting molten steel.

Furthermore, with a view to preventing reduction or clogging of the bore of the molten steel pouring nozzle without the use of a mechanical means such as the ejection of an inert gas, there is disclosed in Japanese Patent Provisional Publication No. 57-71,860 dated May 5, 1982, another molten steel pouring nozzle formed of a refractory consisting essentially of:
graphite : from 10 to 50 wt.%,
calcium oxide : from 20 to 75 wt.%, and
the balance being metallic aluminum and silicon (hereinafter referred to as the "prior art 2").

However, the above-mentioned molten steel pouring nozzle of the prior art 2 has the following problems:

It is true that calcium oxide (CaO) rapidly reacts with non-metallic inclusions such as $\alpha$-alumina, which are produced through the reaction of aluminum added as a deoxidizer with oxygen present in molten steel, to produce low-melting-point compounds. Therefore, calcium oxide has a function of preventing the non-metallic inclusions such as $\alpha$-alumina from adhering and accumulating onto the surface of the bore of the nozzle. However, calcium oxide, when present alone, violently reacts with water or moisture in the air even at the room temperature to produce calcium hydroxide ($Ca(OH)_2$), which easily disintegrates and tends to become powdery, thus easily causing degradation of the structure of the molten steel pouring nozzle. Great care is therefore necessary for storing the molten steel pouring nozzle. In addition, because of the high thermal expansion coefficient of calcium oxide, a considerable thermal stress is produced in the interior of the molten steel pouring nozzle when calcium oxide is present alone and subjected to heating which causes a non-uniform temperature distribution, thus resulting in a lower thermal shock resistance of the molten steel pouring nozzle.

For the problems as described above, it is difficult to use a molten steel pouring nozzle made of a refractory, in which calcium oxide is present alone, for a long period of time for continuous casting of molten steel.

Finally, with a view to preventing reduction or clogging of the bore of the molten steel pouring nozzle without the use of a mechanical means such as the ejection of an inert gas, there is disclosed in Japanese Patent Provisional Publication No. 64-40,154 dated Feb. 10, 1989, further another molten steel pouring nozzle formed of a refractory consisting essentially of:
graphite : from 10 to 40 wt.%,
calcium zirconate : from 60 to 90 wt.%,
where, a content of calcium oxide in said calcium zirconate being within a range of from 23 to 36 weight parts relative to 100 weight parts of said calcium zirconate.
(hereinafter referred to as the "Prior art 3").

However, the above-mentioned molten steel pouring nozzle of the prior art 3 has the following problems:

For the purpose of overcoming the problems encountered in the prior art 2, in which calcium oxide is present alone, the molten steel pouring nozzle of the prior art 3 is formed of a refractory mainly comprising calcium zirconate. Therefore, it is true that contact of calcium oxide contained in calcium zirconate with the produced non-metallic inclusions such as $\alpha$-alumina causes the acceleration of reaction between these components, thus producing low-melting-point compounds. Since calcium oxide is not present alone, no degradation of the structure of the molten steel pouring nozzle is caused. In the prior art 3, however, calcium oxide contained in calcium zirconate does not move sufficiently toward the surface of the bore of the molten steel pouring nozzle, through which molten steel flows, so that calcium oxide does not come into sufficient contact with the produced non-metallic inclusions such as $\alpha$-alumina. As a result, the production of low-melting-point compounds brought about by the reaction between calcium oxide and the non-metallic inclusions such as $\alpha$-alumina is insufficient to effectively prevent adhesion and accumulation of the non-metallic inclusions such as $\alpha$-alumina onto the surface of the bore of the molten steel pouring nozzle.

Under such circumstances, there is a strong demand for the development of a molten steel pouring nozzle which permits prevention of reduction or clogging of the bore of the nozzle and degradation of the structure of the refractory forming the nozzle economically and for long period of time without the use of a mechanical means such as the ejection of an inert gas, but such a molten steel pouring nozzle has not as yet been proposed.

SUMMARY OF THE INVENTION

An object of the present invention is therefore to provide a molten steel pouring nozzle which permits prevention of reduction or clogging of the bore of the nozzle and degradation of the structure of the refractory forming the nozzle economically and for long period of time without the use of a mechanical means such as the ejection of an inert gas.

In accordance with one of the features of the present invention, there is provided a molten steel pouring nozzle having, along the axis thereof, a bore through which molten steel flows, wherein:

at least part of an inner portion of said molten steel pouring nozzle, which inner portion forms said bore, is formed of a refractory consisting essentially of:
zirconia clinker comprising calcium zirconate : from 40 to 89 wt.%,
where, a content of calcium oxide in said zirconia clinker being within a range of from 8 to 35 weight parts relative to 100 weight parts of said zirconia clinker;
graphite : from 10 to 35 wt.%; and
calcium silicate : from 1 to 25 wt.%,
where, a content of calcium oxide in said calcium silicate being within a range of from 40 to 54 weight parts relative to 100 weight parts of said calcium silicate.

BRIEF DESCRIPTION OF THE DRAWINGS

FIG. 1 is a schematic vertical sectional view illustrating a first embodiment of the molten steel pouring nozzle of the present invention as an immersion nozzle;

FIG. 2 is a schematic vertical sectional view illustrating a second embodiment of the molten steel pouring nozzle of the present invention as an immersion nozzle.

DETAILED DESCRIPTION OF PREFERRED EMBODIMENTS

From the above-mentioned point of view, extensive studies were carried out to develop a molten steel pouring nozzle which permits prevention of reduction or clogging of the bore of the nozzle and degradation of the structure of the refractory forming the nozzle economically and for long period of time without the use of a mechanical means such as the ejection of an inert gas.

As a result, the following findings were obtained: By forming a molten steel pouring nozzle with the use of a refractory containing zirconia clinker which comprises calcium zirconate, it is possible to inhibit a violent reaction of calcium oxide with water or moisture in the air, thus preventing degradation of the structure of the molten steel pouring nozzle. More particularly, zirconia clinker comprising calcium zirconate and having a prescribed particle size is prepared by melting calcium oxide and zirconia in an electric furnace at a high temperature of at least 1,600° C., then cooling the resultant melt to solidify same, and then pulverizing the resultant solid. The thus prepared zirconia clinker, which comprises calcium zirconate ($CaO.ZrO_2$), is stable similarly to stabilized zirconia, and has a low thermal expansion coefficient, and inhibits violent reaction of calcium oxide with water or moisture in the air, thus preventing degradation of the structure of the molten steel pouring nozzle.

Furthermore, when the above-mentioned zirconia clinker comprising calcium zirconate coexists with calcium silicate ($CaO.SiO_2$), calcium oxide in each particle of zirconia clinker tends to easily move toward the surface of each particle of zirconia clinker under the effect of the above-mentioned coexisting calcium silicate. In other words, calcium oxide, which is to react which $\alpha$-alumina in molten steel, which is the main constituent of the non-metallic inclusions adhering onto the surface of the bore of the molten steel pouring nozzle, moves toward the surface of each particle of zirconia clinker and gathers there.

Furthermore, in addition to the above-mentioned function, calcium silicate has a function of replenishing the quantity of calcium oxide, which is to react with $\alpha$-alumina in molten steel.

Moreover, calcium silicate which is poor in refractoriness, when used together with graphite and zirconia clinker comprising calcium zirconate, never causes degradation of refractoriness of the refractory.

It is thus possible to inhibit a violent reaction of calcium oxide with water or moisture in the air, facilitate reaction between calcium oxide and $\alpha$-alumina, permit such reaction to continue for a long period of time to produce low-melting-point compounds such as $CaO.Al_2O_3$ and $3CaO.Al_2O_3$, and thus to effectively prevent, for a long period of time, the non-metallic inclusions such as $\alpha$-alumina from adhering and accumulating onto the surface of the bore of the molten steel pouring nozzle.

The present invention was made on the basis of the above-mentioned findings. At least part of an inner portion of the molten steel pouring nozzle of the present invention, which inner portion forms a bore thereof, is formed of a refractory consisting essentially of:

zirconia clinker comprising calcium zirconate : from 40 to 89 wt.%,
where, a content of calcium oxide in said zirconia clinker being within a range of from 8 to 35 weight parts relative to 100 weight parts of said zirconia clinker;
graphite : from 10 to 35 wt.%; and
calcium silicate : from 1 to 25 wt.%, where, a content of calcium oxide in said calcium silicate being within a range of from 40 to 54 weight parts relative to 100 weight parts of said calcium silicate.

Now, the following paragraphs describe the reasons of limiting the chemical composition of the refractory forming at least part of an inner portion of the molten steel pouring nozzle of the present invention, which inner portion forms a bore thereof, as mentioned above.

(1) Zirconia Clinker Comprising Calcium Zirconate

Zirconia clinker has a low thermal expansion coefficient and is excellent in spalling resistance. With a content of zirconia clinker of under 40 wt.%, however, the amount of calcium oxide, which is to react with the non-metallic inclusions such as $\alpha$-alumina in molten steel, becomes insufficient, thus making it impossible to prevent adhesion and accumulation of the non-metallic inclusions such as $\alpha$-alumina onto the surface of the bore of the molten steel pouring nozzle. With a content of zirconia clinker of over 89 wt.%, on the other hand, there occurs abnormality in the thermal expansion coefficient and at a temperature of at least about 900° C., and spalling resistance is deteriorated. The content of zirconia clinker should therefore be limited within a range of from 40 to 89 wt.%. Zirconia clinker should preferably have an average particle size of up to 44 $\mu$m in order to ensure a satisfactory surface smoothness of the nozzle.

(2) Calcium Oxide Contained in Zirconia Clinker Comprising Calcium Zirconate

Calcium oxide contained in zirconia clinker, of which the property of violently reacting with water or moisture in the air is largely decreased, reacts with the non-metallic inclusions such as $\alpha$-alumina in molten steel to produce the low-melting-point compounds. However, with a content of calcium oxide in zirconia clinker of under 8 weight parts relative to 100 weight parts of zirconia clinker, a desrred effect as described above is unavailable, and the presence of buddeleyite ($ZrO_2$) in zirconia clinker causes degradation of the structure of the molten steel pouring nozzle. A content of calcium oxide in zirconia clinker of over 35 weight parts relative to 100 weight parts of zirconia clinker, on the other hand, calcium oxide, which is not dissolved into calcium zirconate, and reacts violently with water or moisture in the air, and has a high thermal expansion coefficient, is present alone in zirconia clinker, resulting in degradation of the structure of the molten steel pouring nozzle. The content of calcium oxide in zirconia clinker should therefore be limited within a range of from 8 to 35 weight parts relative to 100 weight parts of zirconia clinker.

(3) Graphite

Graphite has a function of improving oxidation resistance of a refractory and wetting resistance thereof against molten steel, and increasing thermal conductivity of the refractory. Particularly, natural graphite is suitable for obtaining the above-mentioned function. With a content of graphite of under 10 wt.%, however, a desired effect as described above cannot be obtained, and spalling resistance is poor. With a content of graphite of over 35 wt.%, on the other hand, corrosion resistance is degraded. The content of graphite should therefore be limited within a range of from 10 to 35 wt.%. Graphite should preferably have an average particle size of up to 5 500 $\mu$m with a view to improving the above-mentioned function.

(4) Calcium Silicate

Calcium silicate ($CaO.SiO2$) has a function of promoting calcium oxide in each particle of zirconia clinker to move toward the surface of each particle of zirconia clinker and to gather there. Calcium silicate has furthermore a function of replenishing the quantity of calcium oxide, which is to react with α-alumina in molten steel. With a content of calcium silicate of under 1 wt.%, however, a desired effect as described above cannot be obtained. With a content of calcium silicate of over 25 wt.%, on the other hand, the structure of the refractory is degraded, thus leading to a lower corrosion resistance and a lower refractoriness. The content of calcium silicate should therefore be limited within a range of from 1 to 25 wt.%, and more preferably, within a range of from 2 to 20 wt.%. With a view to improving the above-mentioned functions of calcium silicate and achieving a satisfactory surface smoothness of the nozzle, calcium silicate should preferably have an average particle size of up to 44 μm. As calcium silicate, for example, calcium metasilicate comprising 48.3 wt.% CaO and 51.7 wt.% $SiO_2$ may be used.

(5) Calcium Oxide Contained in Calcium Silicate

Calcium oxide contained in calcium silicate (CaO.- $SiO_2$) has a function of replenishing the quantity of calcium oxide in zirconia clinker, which is to react with α-alumina in molten steel. When a molar ratio of calcium oxide to silica in calcium silicate is 1 : 1, calcium oxide contained in calcium silicate never reacts violently with water or moisture in the air. With a content of calcium oxide in calcium silicate of under 40 weight parts relative to 100 weight parts of calcium silicate, there is unavailable a desired effect as described above of replenishing the quantity of calcium oxide in zirconia clinker. With a content of calcium oxide in calcium silicate of over 54 weight parts relative to 100 weight parts of calcium silicate, on the other hand, calcium oxide, which is not dissolved into calcium silicate, violently reacts with water or moisture in the air to degrade the structure of the molten steel pouring nozzle. The content of calcium oxide in calcium silicate should therefore be limited within a range of from 40 to 54 weight parts relative to 100 weight parts of calcium silicate.

For the purpose of improving spalling resistance and oxidation resistance of the refractory forming the molten steel pouring nozzle, silicon carbide may further be added.

Now, embodiments of the molten steel pouring nozzle of the present invention are described with reference to the drawings.

FIG. 1 is a schematic vertical sectional view illustrating a first embodiment of the molten steel pouring nozzle of the present invention as an immersion nozzle. The molten steel pouring nozzle of the first embodiment is used as an immersion nozzle which is arranged between a tundish and a vertical mold arranged below the tundish. As shown in FIG. 1, the molten steel pouring nozzle 4 of the first embodiment of the present invention has, along the axis thereof, a bore 1 through which molten steel flows. An inner portion 2 of the molten steel pouring nozzle 4, which forms the bore 1, is formed of a refractory having the above-mentioned chemical composition. An outer portion 3 surrounding the inner portion 2 is formed of a refractory, for example, an alumina-graphite refractory having an excellent erosion resistance against molten steel. According to the above-mentioned molten steel pouring nozzle 4, it is possible to prevent for a long period of time adhesion and accumulation of the non-metallic inclusions such as α-alumina present in molten steel onto the surface of the inner portion 2 of the molten steel pouring nozzle 4, which forms the bore 1.

FIG. 2 is a schematic vertical sectional view illustrating a second embodiment of the molten steel pouring nozzle of the present invention as an immersion nozzle.

As shown in FIG. 2, a molten steel pouring nozzle 4 of the second embodiment of the present invention is identical in construction to the above-mentioned molten steel pouring nozzle 4 of the first embodiment of the present invention, except that the whole of a lower portion of the molten steel pouring nozzle 4, which forms a lower portion of a bore 1, is formed of a refractory having the above-mentioned chemical composition. Therefore, the same reference numerals are assigned to the same components as those in the first embodiment, and the description thereof is omitted.

The molten steel pouring nozzle 4 of the second embodiment has a service life longer than that of the molten steel pouring nozzle 4 of the first embodiment, since the refractory having the above-mentioned chemical composition, which forms the lower portion of the bore 1, where reaction between calcium oxide and the non-metallic inclusions such as α-alumina takes place most actively, has a sufficient thickness as shown in FIG. 2.

Now, the molten steel pouring nozzle of the present invention is described more in detail by means of an example.

EXAMPLE

First, calcium oxide (CaO) and zirconia ($ZrO_2$) were melted in an electric furnace at a temperature of at least 1,600° C., then, the resultant melt was cooled to a room temperature to solidify same, and then, the resultant solid was pulverized in a ball mill to prepare zirconia clinker having an average particle size of up to 44 μm comprising calcium zirconate ($CaO.ZrO_2$). The content of calcium oxide in the thus prepared zirconia clinker was within a range of from 8 to 35 weight parts relative to 100 weight parts of zirconia clinker.

Then, phenol resin in the state of powder and liquid was added in an amount within a range of from 5 to 10 wt.%, to each of blended raw materials Nos. 1 to 4 including the above-mentioned zirconia clinker comprising calcium zirconate, having the chemical compositions within the scope of the present invention as shown in Table 1. Each of these blended raw materials Nos. 1 to 4 added with phenol resin, was mixed and kneaded to obtain a kneaded mass. A formed body having dimensions of 30 mm ×30 mm×230 mm for testing an amount of adhesion of the non-metallic inclusions such as α-alumina and corrosion resistance against molten steel, and another tubular formed body having an outside diameter of 100 mm, an inside diameter of 60 mm and a length of 250 mm for testing spalling resistance, were formed from each of the thus obtained kneaded masses. Then, these formed bodies were reduction-fired at a temperature within a range of from 1,000° to 1,200° C. to prepare samples within the scope of the present invention (hereinafter referred to as the "samples of the invention") Nos. 1 to 4.

Then, phenol resin in the state of powder and liquid was added in an amount within a range of from 5 to 10 wt.%, to each of blended raw materials Nos. 5 to 9 including the above-mentioned zirconia clinker, having the chemical compositions outside the scope of the present invention as shown in Table 1. Each of these blended raw materials Nos. 5 to 9 added with phenol resin, was mixed and kneaded to obtain a kneaded mass.

A formed body having dimensions of 30 mm×30 mm×230 mm for testing an amount of adhesion of the non-metallic inclusions such as α-alumina and corrosion resistance against molten steel, and another tubular formed body having an outside diameter of 100 mm, an inside diameter of 60 mm and a length of 250 mm for testing spalling resistance, were formed from each of the thus obtained kneaded masses. Then, these formed bodies were reduction-fired at a temperature within a range of from 1,000° to 1,200° C. to prepare samples outside the scope of the present invention (hereinafter referred to as the "samples for comparison") Nos. 5 to 9.

TABLE 1

| Chemical composition of blended raw materials | Sample of the invention | | | | Sample for comparison | | | | (wt. %) |
| --- | --- | --- | --- | --- | --- | --- | --- | --- | --- |
|  | No. 1 | No. 2 | No. 3 | No. 4 | No. 5 | No. 6 | No. 7 | No. 8 | No. 9 |
| Zirconia clinker comprising calcium zirconate (44 82 m) | 78 | 75 | 70 | 60 | 90 | 50 | 50 | — | — |
| Graphite (500 μm) | 20 | 20 | 20 | 20 | 10 | 20 | 40 | 20 | 20 |
| Calcium silicate (44 μm) | 2 | 5 | 10 | 20 | — | 30 | 10 | — | — |
| Cubic zirconia | — | — | — | — | — | — | — | 55 | — |
| Baddeleyite | — | — | — | — | — | — | — | 15 | — |
| Silicon carbide | — | — | — | — | — | — | — | 10 | 5 |
| Alumina | — | — | — | — | — | — | — | — | 75 |

For each of the above-mentioned samples of the invention Nos. 1 to 4 and the samples for comparison Nos. 5 to 9, bulk specific gravity and porosity were measured. The results are shown in Table 2.

Then, each of the tubular samples of the invention Nos. 1 to 4 and the tubular samples for comparison Nos. 5 to 9, having an outside diameter of 100 mm, an inside diameter of 60 mm and a length of 250 mm, was heated in an electric furnace at a temperature of 1,500° C. for 30 minutes, and then, rapidly water-cooled to investigate spalling resistance. The results ar shown in Table 2.

Subsequently, each of the samples of the invention Nos. 1 to 4 and the samples for comparison Nos. 5 to 9, having dimensions of 30 mm×30 mm×230 mm, was immersed in molten steel at a temperature of 1,550° C. containing aluminum in an amount within a range of from 0.03 to 0.05 wt.% for 180 minutes to investigate an erosion ratio (%) and an amount of adhesion (mm) of the non-metallic inclusions such as α-alumina. The results are also shown in Table 2.

α-alumina, thus permitting effective inhibition of reduction or clogging of the bore of the molten steel pouring nozzle. The samples for comparison Nos. 5 to 9 have in contract a large amount of adhesion of the non-metallic inclusions such as α-alumina when the erosion ratio is low, whereas the samples for comparison Nos. 5 to 9 have a high erosion ratio when there is no adhesion of the non-metallic inclusion such as α-alumina. More specifically, the sample for comparison No. 5 is very poor in spalling resistance, since the content of zirconia clinker comprising calcium zirconate is high outside the scope of the present invention. In addition, the sample for comparison No. 5 has a large amount of adhesion of the non-metallic inclusions such as α-alumina, since calcium silicate is not contained. The sample for comparison No. 6 is very poor in corrosion resistance against molten steel, since the content of calcium silicate is high outside the scope of the present invention. The sample for comparison No. 7 is very poor in corrosion resistance against molten steel, since the content of graphite is high outside the scope of the present invention although the content of zirconia clinker comprising calcium zirconate and the content of calcium silicate are within the scope of the present invention. The samples for comparison Nos. 8 and 9 have a large amount of adhesion of the non-metallic inclusions such as α-alumina, since neither zirconia clinker comprising calcium zirconate nor calcium silicate is contained.

According to the molten steel pouring nozzle of the present invention, as described above in detail, it is possible to stably inhibit reduction or clogging of the bore of the nozzle caused by adhesion of the non-metallic inclusions such as α-alumina for a long period of time

TABLE 2

|  | Sample of the invention | | | | Sample for comparison | | | | |
| --- | --- | --- | --- | --- | --- | --- | --- | --- | --- |
|  | No. 1 | No. 2 | No. 3 | No. 4 | No. 5 | No. 6 | No. 7 | No. 8 | No. 9 |
| Porosity (%) | 20.4 | 19.8 | 19.0 | 18.6 | 19.8 | 17.0 | 19.5 | 19.3 | 18.7 |
| Bulk specific gravity | 2.90 | 2.82 | 2.76 | 2.73 | 3.15 | 2.67 | 2.40 | 3.49 | 2.67 |
| Erosion ratio (%) | 8 | 10 | 11 | 15 | 3 | 26 | 30 | 3 | 3 |
| Spalling resistance | No crack | No crack | No crack | No crack | Crack occurence | Crack occurence | No crack | No crack | No crack |
| Amount of adhesion of alumina (mm) | Almost zero | Almost zero | Almost zero | Almost zero | 15 | Almost zero | Almost zero | 15 | 15 |

As is clear from Table 2, all the samples of the invention Nos. 1 to 4 show a low erosion ratio, so that it is possible to avoid deterioration of the structure of the refractory. In addition, the samples of the invention Nos. 1 to 4 have an excellent spalling resistance and have no adhesion of the non-metallic inclusions such as without causing degradation of the structure of the refractory.

What is claimed is:

1. A molten steel pouring nozzle having, along the axis thereof, a bore through which molten steel flows, wherein:
    at least part of an inner portion of said molten steel pouring nozzle, which inner portion forms said bore, is formed of a refractory consisting essentially of:
    40 to 89 weight % zirconia clinker comprising calcium zirconate
    where, a content of calcium oxide in said zirconia clinker being within a range of from 8 to 35 weight parts relative to 100 weight parts of said zirconia clinker;
    from 10 to 35 weight % of graphite; and from 1 to 25 weight % of calcium silicte
    where, a content of calcium oxide in said calcium silicate being within a range of from 40 to 54 weight parts relative to 100 weight parts of said calcium silicate.

2. The molten steel pouring nozzle as claimed in claim 1, wherein:
    the whole of said molten steel pouring nozzle is formed of said refractory.

3. The molten steel pouring nozzle as claimed in claim 1, wherein:
    said inner portion of said molten steel pouring nozzle, which inner portion forms said bore, is formed of said refractory.

4. The molten steel pouring nozzle as claimed in claims 1, 2, or 3, wherein:
    said zirconia clinker has an average particle size up to 44 μm; said graphite has an average particle size of up to 500 μm; and said calcium silicate has an average particle size of up to 44 μm.

5. The molten steel pouring nozzle as claimed in claim 1, wherein the content of said calcium silicate is from 2 to 20 weight %.

6. The molten steel pouring nozzle as claimed in claim 5, wherein the whole of said molten steel pouring nozzle is formed of said refractory.

7. The molten steel pouring nozzle as claimed in claim 5, wherein said inner portion of said molten steel pouring nozzle, which inner portion forms said bore, is formed of said refractory.

8. The molten steel pouring nozzle as claimed in claim 5, wherein said zirconia clinker has an average particle size of up to 44 μm; said graphite has an average particle size of up to 500 μm; and said calcium silicate has an average particle size of up to 44 μm.

9. The molten steel pouring nozzle as claimed in claim 6, wherein said zirconia clinker has an average particle size of up to 44 μm; said graphite has an average particle size of up to 500 μm; and said calcium silicate has an average particle size of up to 44 μm.

10. The molten steel pouring nozzle as claimed in claim 7, wherein said zirconia clinker has an average particle size of up to 44 μm; said graphite has an average particle size of up to 500 μm; and said calcium silicate has an average particle size of up to 44 μm.

11. The molten steel pouring nozzle as claimed in claim 10, wherein the calcium silicate is calcium metasilicate comprising 48.3 weight % CaO and 51.7 weight % $SiO_2$.

12. The molten steel pouring nozzle as claimed in claim 10, wherein the zirconia clinker is in an amount of 78 weight % and has an average particle size of 44 μm, the graphite is in an amount of 20 weight % and has an average particle size of 500 μm and the calcium silicate is in an amount of 2 weight % and has an average particle size of 44 μm.

13. The molten steel pouring nozzle as claimed in claim 10, wherein the zirconia clinker is in an amount of 75 weight % and has an average particle size of 44 μm, the graphite is in an amount of 20 weight % and has an average particle size of 500 μm and the calcium silicate is in an amount of 5 weight % and has an average particle size of 44 μm.

14. The molten steel pouring nozzle as claimed in claim 10, wherein the zirconia clinker is in an amount of 70 weight % and has an average particle size of 44 μm, the graphite is in an amount of 20 weight % and has an average particle size of 500 μm and the calcium silicate is in an amount of 10 weight % and has an average particle size of 44 μm.

* * * * *